United States Patent [19]

Ohnuki et al.

[11] Patent Number: 4,728,785
[45] Date of Patent: Mar. 1, 1988

[54] FOCUS DETECTING DEVICE USING ADJUSTABLE INCLINED SENSING MEANS

[75] Inventors: Ichiro Ohnuki, Tokyo; Yasuo Suda, Yokohama; Akira Ishizaki, Yokohama; Akira Akashi, Yokohama; Keiji Ohtaka; Takeshi Koyama, both of Tokyo, all of Japan

[73] Assignee: Canon Kabushiki Kaisha, Tokyo, Japan

[21] Appl. No.: 947,824

[22] Filed: Dec. 30, 1986

[30] Foreign Application Priority Data

Jan. 10, 1986 [JP] Japan .................. 61-003003
Jan. 10, 1986 [JP] Japan .................. 61-003007

[51] Int. Cl.⁴ .................................. G01J 1/20
[52] U.S. Cl. ..................... 250/201; 354/408
[58] Field of Search ............... 250/201 PF, 204; 354/402–404, 408

[56] References Cited

U.S. PATENT DOCUMENTS

3,950,764  4/1976  Hosoe et al. ................. 354/404
4,329,578  5/1982  Rosner ..................... 250/201 PF
4,689,480  8/1987  Stern ......................... 354/404

Primary Examiner—David C. Nelms
Assistant Examiner—Stephone B. Allen
Attorney, Agent, or Firm—Fitzpatrick, Cella, Harper & Scinto

[57] ABSTRACT

An adjusting screw for adjusting the inclination of a sensor unit body including sensing means for producing the information about the focus adjusted state on the basis of a light beam from an objective lens is moved with the sensor unit body perpendicularly to the optic axis of the objective lens, whereby adjustment of the optic axis of the objective lens is accomplished. At least two adjusting means are provided for inclining the sensing means itself at a predetermined angle with respect to the optic axis.

7 Claims, 11 Drawing Figures

FOCUS DETECTING DEVICE USING ADJUSTABLE INCLINED SENSING MEANS

BACKGROUND OF THE INVENTION

1. Field of the Invention

This invention relates to a focus detecting device used in still cameras, etc. and in particular, to the assembly adjusting mechanism thereof.

2. Related Backgound Art

A photo-taking light beam passing through a photo-taking lens is directed to a line sensor comprising a photoelectric conversion element, and the focus adjusted state of the photo-taking lens is generally detected on the basis of the output condition of the line sensor. The line sensor and a focus detecting optical system for directing the light beam to the line sensor are made into a unit, whereafter the unit is mounted on a camera body, whereby a camera is assembled.

At such time, bringing the optic axis of the photo-taking lens in the camera body into coincidence with the optic axis for detecting the focus in the focus detecting unit body is an important factor in enhancing the detection accuracy. This also holds true of the angle of inclination of the surface of the line sensor with respect to the optic axis.

An example in which adjustment of the inclination of the photoelectric conversion element is effected is proposed in U.S. application Ser. No. 740,492. Such proposition discloses the technique of ensuring the light-receiving surface of the line sensor to keep a desired angle with respect to the optic axis. This is because there is a problem that an attempt to adjust, for example, the lengthwise inclination of the line sensor with respect to the optic axis would leave the inclination of the line sensor in a direction perpendicular thereto. In Japanese Laid-Open Patent Application No. 39612/1985, the inclination of the unit body is adjusted to thereby accomplish pupil alignment adjustment. That is, the optic axis of the unit body is made to face the center of the pupil of the photo-taking lens. However, this does not always bring the photo-taking optic axis into coincidence with the optic axis of the unit body, and thus causes parallax.

SUMMARY OF THE INVENTION

It is a first object of the present invention to suitably move a focus detecting sensor and thereby form a good image on the sensor.

It is a second object of the present invention to stably adjust the inclination of the line sensor to a desired angle with respect to the photo-taking optic axis under the first object.

It is a third object of the present invention to accomplish, under the first object, the adjustment for bringing the optic axis of the focus detecting unit body into coincidence with the photo-taking optic axis, by moving the unit body on a plane perpendicular to the optic axis.

Further objects of the present invention will become apparent from the following detailed description taken in conjunction with the accompanying drawings.

DESCRIPTION OF THE PREFERRED EMBODIMENTS

The present invention will hereinafter be described in detail with respect to some embodiments thereof shown in the drawings.

Figure 1:
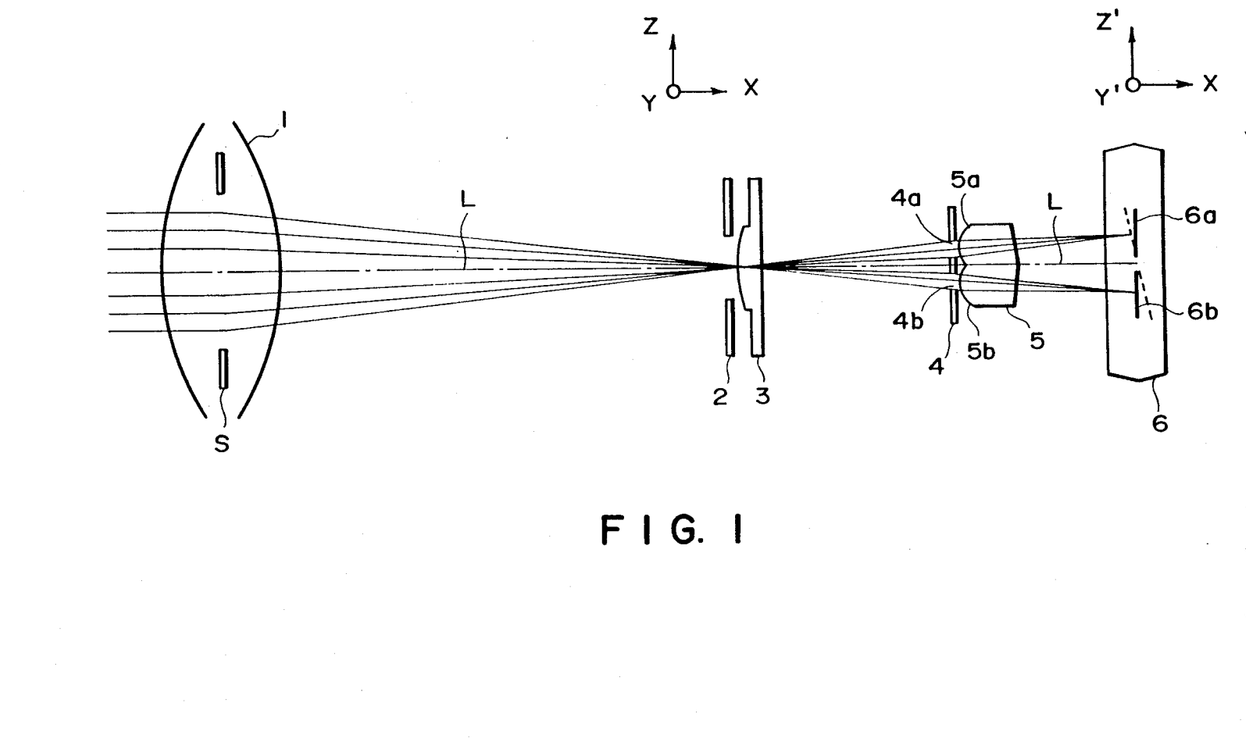
FIG. 1 shows a basic construction.

Referring to FIG. 1 which shows the basic construction of an optical system according to the present invention, reference numeral 1 designates a photo-taking lens, and along the optic axis thereof, there are disposed in succession a view field mask 2, a field lens 3, a diaphragm 4 having two openings 4a and 4b symmetrical with respect to the optic axis, a secondary imaging lens 5 comprising two positive lens elements 5a and 5b, and a line sensor 6 comprising two photoelectric element arrays 6a and 6b. Letter L denotes the optic axis of the photo-taking lens 1, and letter L' designates an extension axis of the optic axis. The optic axes of the positive lens elements are parallel to the extension axis L'.

The view field mask 2 prevents any unnecessary light beam outside the distance measurement view field from entering a focusing device system, and the field lens 3 serves to place the openings 4a and 4b of the diaphragm 4 and the exit pupil S of the photo-taking lens into an imaging relation and thereby effectively direct the light beam passed through the photo-taking lens 1 to the line sensor 6. The diaphragm 4 is for limiting the light beam. The two positive lens elements 5a and 5b of the secondary imaging lens 5 serve to re-image the light beams passing through different areas of the exit pupil S of the photo-taking lens 1 on the line sensor 6. The correlation between the positions of the two images re-formed by the secondary imaging lens 5 is found from the outputs of the two arrays 6a and 6b of the line sensor 6, whereby the amount of defocus is detected. The secondary imaging lens 5 forms secondary images having a parallax on the photoelectric element arrays of the line sensor 6 from the light beams passed through different areas of the exit pupil S of the photo-taking lens 1.

Figure 2:
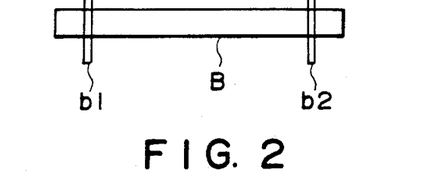
FIG. 2 illustrates a distance measurement error.

Assuming that the two arrays 6a and 6b of the line sensor 6 are inclined about the axis Y' as indicated by the dotted line, the result of distance measurement differs depending on what position in the distance measurement view field an object to be photographed lies. That is, there occurs a distance measurement error between a case where the object to be photographed lies at the left end b1 of the distance measurement view field B and a case where the object to be photographed lies at the right end b2 of the distance measurement view field B, and in the present invention, such distance measurement error can be reduced.

Figure 3:
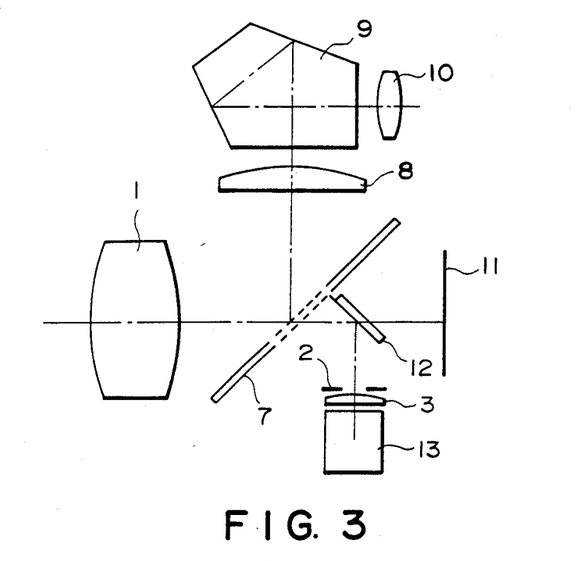
FIG. 3 is a cross-sectional view of the interior of a camera.
Figure 4:
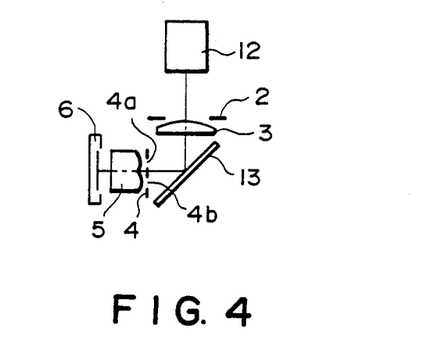
FIG. 4 is a cross-sectional view of a part thereof as seen from another direction.

FIG. 3 is a cross-sectional view of a focus detecting system according to the present invention as applied to a single lens reflex camera. A quick return mirror 7 is disposed behind the photo-taking lens 1 so that the light beam upwardly reflected thereby is directed to a finder system comprising a condenser lens 8, a penta roof type prism 9 and an eyepiece lens 10. A photosensitive film 11 is disposed rearwardly of the quick return mirror 7 and constitutes a photo-taking system with the photo-taking lens 1. A sub-mirror 12 is attached to the back of the light-transmitting portion of the quick return mirror 7 and is adapted to jump up or return with the quick return mirror 7. As shown in the cross-sectional view of FIG. 4 which is a view of the focusing optical system of FIG. 3 as seen from the side thereof, the view field mask 2 disposed near the predetermined imaging plane of the photo-taking lens 1, the field lens 3, a mirror 13 for bending the optical path, the diaphragm 4 having two openings 4a and 4b symmetrical with respect to the optic axis, the secondary imaging lens 5 and the line sensor 6 are arragned in succession on the reflection side of the sub-mirror 12.

Figure 5:
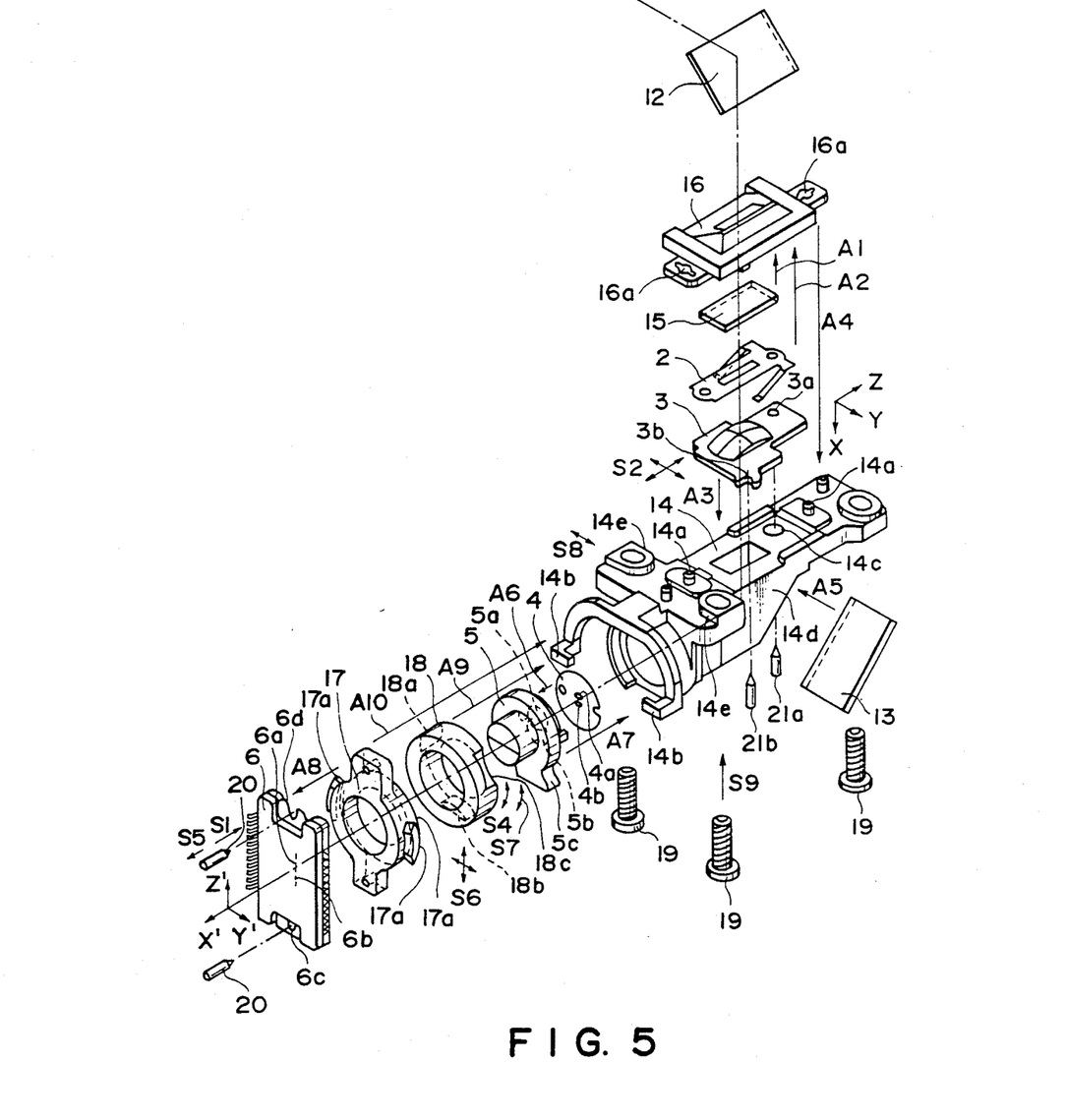
FIG. 5 is an exploded perspective view showing the specific construction of a focusing unit.

FIG. 5 is an exploded perspective view showing a specific example of the construction of a focusing unit. This focusing unit is such that all optical members up to the one which directs the photo-taking light beam reflected by the sub-mirror 12 shown in FIGS. 3 and 4 to the line sensor 6 are mounted in a single unit body 14. An infrared cut filter 15 and an anti-reflection member 16 are inserted between the sub-mirror 12 and the view field mask 2, and the anti-reflection member 16 is for preventing the reflected light on the surface of the infrared cut filter 15 from arriving at the film 11. Between the line sensor 6 and the unit body 14 holding it, as will later be described in detail, there is interposed an adjusting member comprising a fixed member and a rotatable member which are in contact with each other on a contact surface inclined with respect to the optic axis (or inclined with respect to a plane perpendicular to the optic axis), namely, a fixed stage 17 and a rotatable stage 18, so that the inclination of the line sensor 6, particularly in the lengthwise direction thereof, can be adjusted by rotation of the rotatable stage 18. In the case shown, there is shown an example in which the fixed stage 17 lying near the line sensor 6 is coupled to the line sensor 6, but alternatively, the fixed stage 17 may be formed integrally with the package of the line sensor 6. The unit body 14 is fixed to the front plate of a camera by means of mounting screws 19, and the line sensor 6 is tentatively held on the fixed stage 17 by a sensor holding pin 20. The field lens 3 is adjustable by a field lens adjusting pin 21 for movement on a plane above the unit body 14 and perpendicular to the photo-taking optic axis.

The procedures of assembly of the focusing unit will now be described in accordance with the procedures indicated by arrows, A1, A2, A3, ... in FIG. 5.

A1: The infrared cut filter 15 is attached to the anti-reflection member 16.

A2: The view field mask 2 is attached to the infrared cut filter 15.

A3: The field lens 3 is placed onto the unit body 14. The bent arm portion 2a of the view field mask 2 tentatively holds down the field lens.

A4: The hole 16a in the anti-reflection member 16 is forced onto the dowel 14a of the unit body 14, whereby the cut filter 15 is incorporated into the unit body 14.

A5: The mirror 13 is attached to the unit body 14.

A6: The diaphragm 4 is attached to the secondary imaging lens 5.

A7: The positioning part 5c of the secondary imaging lens 5 is pushed against the unit body 14, and the secondary imaging lens 5 is incorporated into the unit body 14 while the positioning in the direction of rotation is effected.

A8: The fixed stage 17 is attached to the line sensor 6.

A9: The rotatable stage 18 is mounted on the unit body 14.

A10: The fixed stage 17 is incorporated into the unit body 14 in such a manner that the fixed stage 17 embraces the rotatable stage 18, and the protrusions 17a and 17b of the fixed stage 17 are tentatively held by the engaging portions 14a and 14b, respectively, of the unit body 14.

The procedures of adjustment will now be described in accordance with arrows S1–S9 (S3 being not shown) in FIG. 5. The unit body 14 is first mounted on an adjustment tool, not shown, and then adjustment is effected by the following procedures.

S1: Sensor holding pins 20 prepared for the aforementioned adjustment tool are inserted into the hole 6c and cut-away hole 6d in the line sensor 6 to thereby control the position of the line sensor 6 relative to the unit body 14.

S2: Pupil alignment i.e., alignment of the focusing unit and the front plate of the camera body with the optic axis, is effected. The adjustment for properly projecting the openings 4a and 4b of the diaphragm 4 into the exit pupil S of the photo-taking lens 1 by the field lens 3 is effected. Actually, field lens adjusting pins 21a and 21b are inserted into the hole 3a and cut-away hole 3b in the field lens 3, and the field lens 3 is made parallel and eccentric, whererafter it is adhesively fixed. A hole 14c has a diameter greater than the diameter of the pin 21a. A mirror box for a tool and an exit pupil for the tool are used as the adjustment standard in this case.

S3: Although not shown, shading correction is effected by the use of a surface chart of uniform brightness, and the irregularity of the quantity of light on the line sensor 6 and the irregularity of the sensitivity of the line sensor 6 are collectively corrected by the EEPROM of a processing circuit, not shown.

S4: The portions 18a, 18b and 18c of the rotatable stage 18 are chucked and the rotatable stage is rotated about the axis X' whereby the line sensor 6 and the fixed stage 17 are rocked together about the axis Y', namely, in the lenghwise direction of the line sensor, whereby adjustment of inclination of the line sensor 6 is accomplished. The principle of this adjusting method will later be described in relation to FIG. 6. After this adjustment, the fixed stage 17 and the rotatable stage 18 are bonded to each other and fixed.

S5: The sensor holding pins 20 are withdrawn.

S6: The chucking of the rotatable stage 18 is left as it is, and the rotatable stage 18 is parallel-moved in the plane Y'-Z', and the centering of the line sensor 6 is effected with the center of the line sensor 6 aligned with the optic acis. A pawl, not shown, for chucking the rotatable stage 18 is not only rotatable but also finely movable in the directions Y' and Z'.

S7: The rotatable stage 18 is rotated and the adjustment of the rotation of the line sensor 6 is effected about the axis X', and the line sensor 6 is adjusted to the direction of the axis Z', whereby adjustment of squint is accomplished.

The adjustment as the focusing unit is completed by the above-described procedures S1–S7 and thus, the focusing unit is detached from the adjustment tool, and then the following adjustments S8 and S9 are effected.

S8: To make the distance measurement center coincident with the center of the distance measurement frame in the finder when the focusing unit is mounted on the front plate of the camera, the entire focusing unit is moved in the direction of the axis Y to thereby adjust the parallax. A groove which fits to the mounting seat 14e of the unit body 14 is provided in the mounting portion of the bottom surface of the front plate of the camera and therefore, in this case, the focusing unit is parallel-moved with the groove as a guide.

S9: The unit body 14 is fixed to the front plate of the camera by means of the mounting screws 19, whereafter the focus of the focusing unit is electrically brought into coincidence by the use of the EEPROM.

The adjustment of the inclination of the line sensor 6 in the aforedescribed procedure S4 and the principle thereof will now be described in detail. In FIG. 5, the concave surfaces 18a, 18b and 18c around the rotatable stage 18 are chucked by the three pawls of a jig, not shown, and the rotatable stage 18 is rotated about the axis X'. In this case, the contact surfaces 17b and 18b of the fixed stage 17 and rotatable stage 18 are parallel to each other and are inclined by a predetermined angle with respect to the optic axis. Since the fixed stage 17 and the line sensor 6 have their rotation controlled by the sensor holding pins 20, the fixed stage 17 and the line sensor 6 are rotatively adjusted together about the axis Y' by rotating only the rotatable stage 18.

Figure 6A:
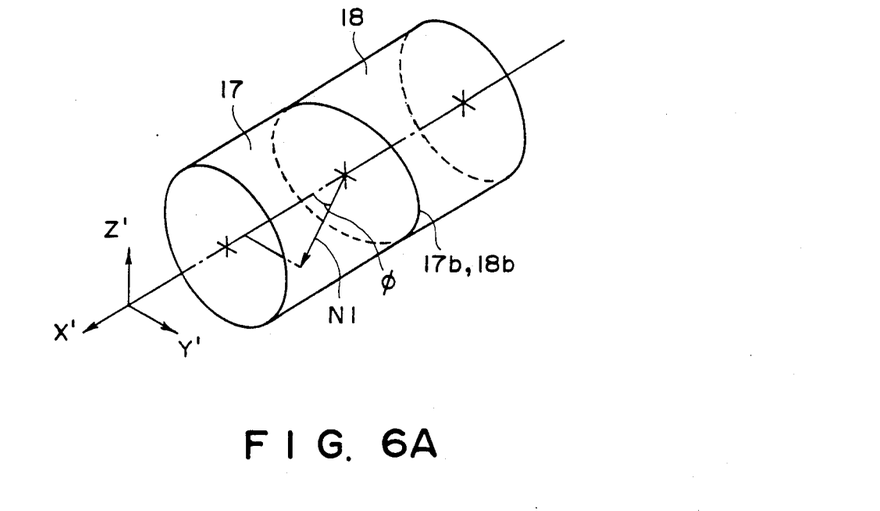
FIG. 6 illustrates the principle of the adjustment of the inclination of a sensor.
Figure 6B:
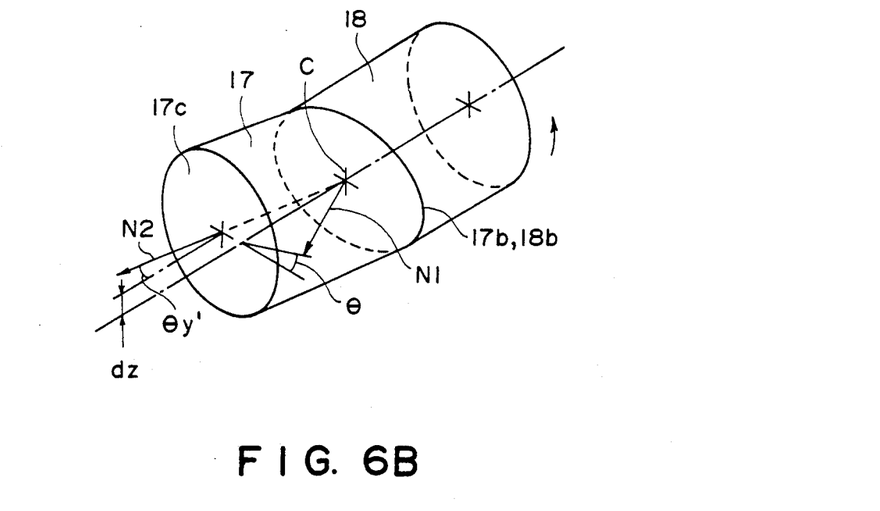

The principle thereof is illustrated in FIG. 6A. The respective contact surfaces 17b and 18b of the fixed stage 17 and rotatable stage 18 are inclined with respect to the plane perpendicular to the optic axis, as previously described, and therefore, the angle of inclination of the normal N1 of the contact surface 18b with respect to the optic axis is tentatively defined as $\phi$. In the initial position of the fixed stage 17, the normal N1 is in the plane X'-Y'. When only the rotatable stage 18 is rotated counter-clockwise by an angle $\theta$, the fixed stage 17 begins to be inclined with respect to the optic axis as shown in FIG. 6B, and the inclination thereof is represented by the angle of inclination $\theta y'$ of the normal N2 in the surface 17c of the fixed stage 17 with respect to the optic axis. The fixed stage 17 is shown to swivel about a point C at which the optic axis intersects the contact surfaces 17b and 18b and therefore, the surface 17c shifts by dz in the direction of the axis Z', but since actually the fixed stage 17 and the sensor 6 are controlled by the sensor holding pins 20, generation of the amount of shift dz is negated by the sliding between the contact surfaces 17b and 18b in the direction of the axis Z' and thus, the center of the line sensor 6 does not deviate from the optic axis.

Figure 7A:
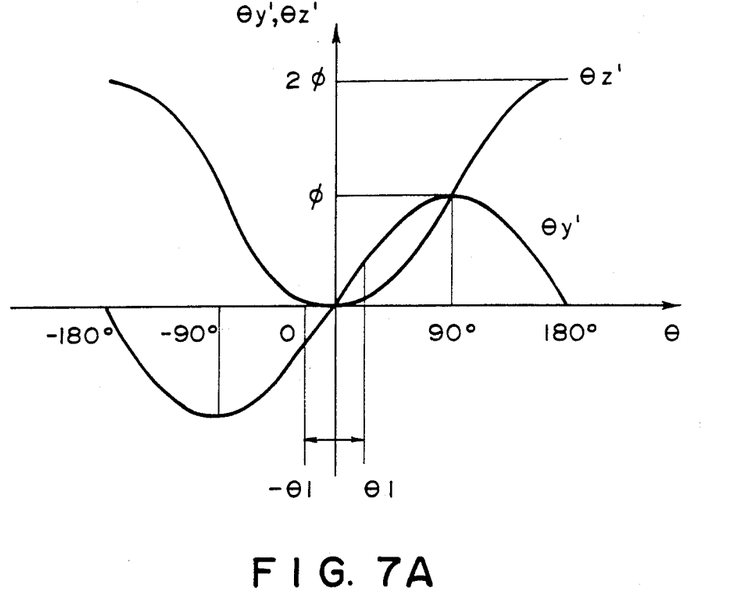
FIGS. 7A and 7B are graphs quantitatively showing the inclination of the line sensor.

The relation between the angles $\theta$ and $\theta y'$ is represented as shown in FIG. 7A. It should be noted here that the normal N1 produces, in addition to the angle of inclination $\theta y'$ about the axis Y', an angle of inclination $\theta z'$ about the axis Z', but the actual adjustment range is a very narrow range between $-\theta_1$ to $\theta_1$ and therefore, within that range, the angle of inclination $\theta z'$, as compared with the angle of inclination nation $\theta y'$, is nearly negligible and poses no problem in practice.

Figure 7B:
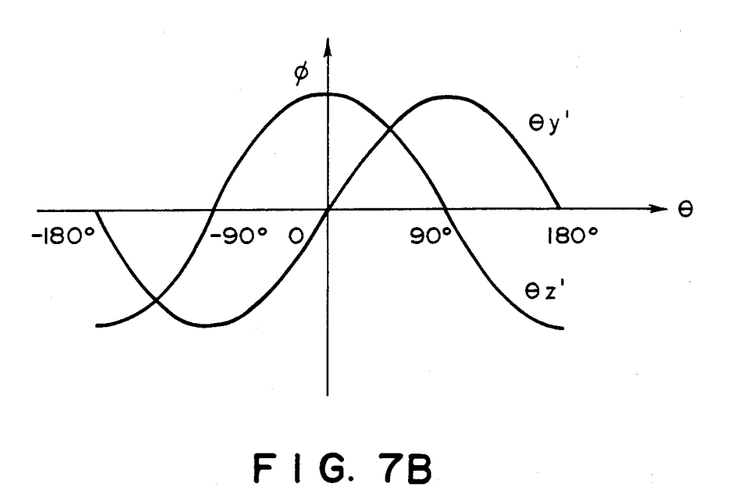

In the case of the prior art, for example, U.S. application Ser. No. 740,492, only the rotatable stage 18 is present and the fixed stage 17 is absent, and the line sensor 6 is in direct contact with the contact surface 18b of the rotatable stage 18 and from the first, there is produced an inclination of $\theta z' = \phi$, and this is shown in FIG. 7B. To reduce the angle of inclination $\theta z'$, $\phi$ may be reduced, but to obtain the same angle of inclination $\theta y'$, it is necessary to increase $\theta$ and adjustment becomes difficult because of the limitation of the range of rotation of the jig, etc.

In contrast with the above-described embodiment, modification may be made such that the line sensor 6 is resiliently held by the unit body 14 which is a holding member therefore, and the fixed stage 17 may be designed to be rotated, or alternatively, the fixed stage 17 may be eliminated and the package surface of the line sensor 6 may be made into an inclined surface parallel to the contact surface 18b, and the line sensor 6 and the rotatable stage 18 may be brought into direct contact with each other. Also, one of such contact surfaces 18b and 17b may be of a discontinuous construction. Further, the other surface of the rotatable stage 18 may be inclined and another fixed stage having an inclined surface opposed thereto may be added so that the rotatable stage 18 is nipped between two fixed stage.

As described above, in the photoelectric adjusting device according to the present invention, when the adjustment of the line sensor in the lengthwise direction thereof is to be effected, little or no inclination in the direction orthogonal thereto is produced and therefore, adjustment is simple and distance adjustment accuracy can be improved. Also, by suitably selecting the angle of the contact surfaces of the rotatable stage and fixed stage, the angle of inclination $\theta y'$ relative to the adjustment angle $\theta$ can be adjusted sensitively and arbitrarily. There is a further advantage that by chucking the rotatable stage and rotating it with the line sensor, instead of chucking the line sensor itself and rotating it, adjustment of all of the inclination, centering, rotation, etc. of the line sensor can be accomplished without re-chucking.

Figure 8:
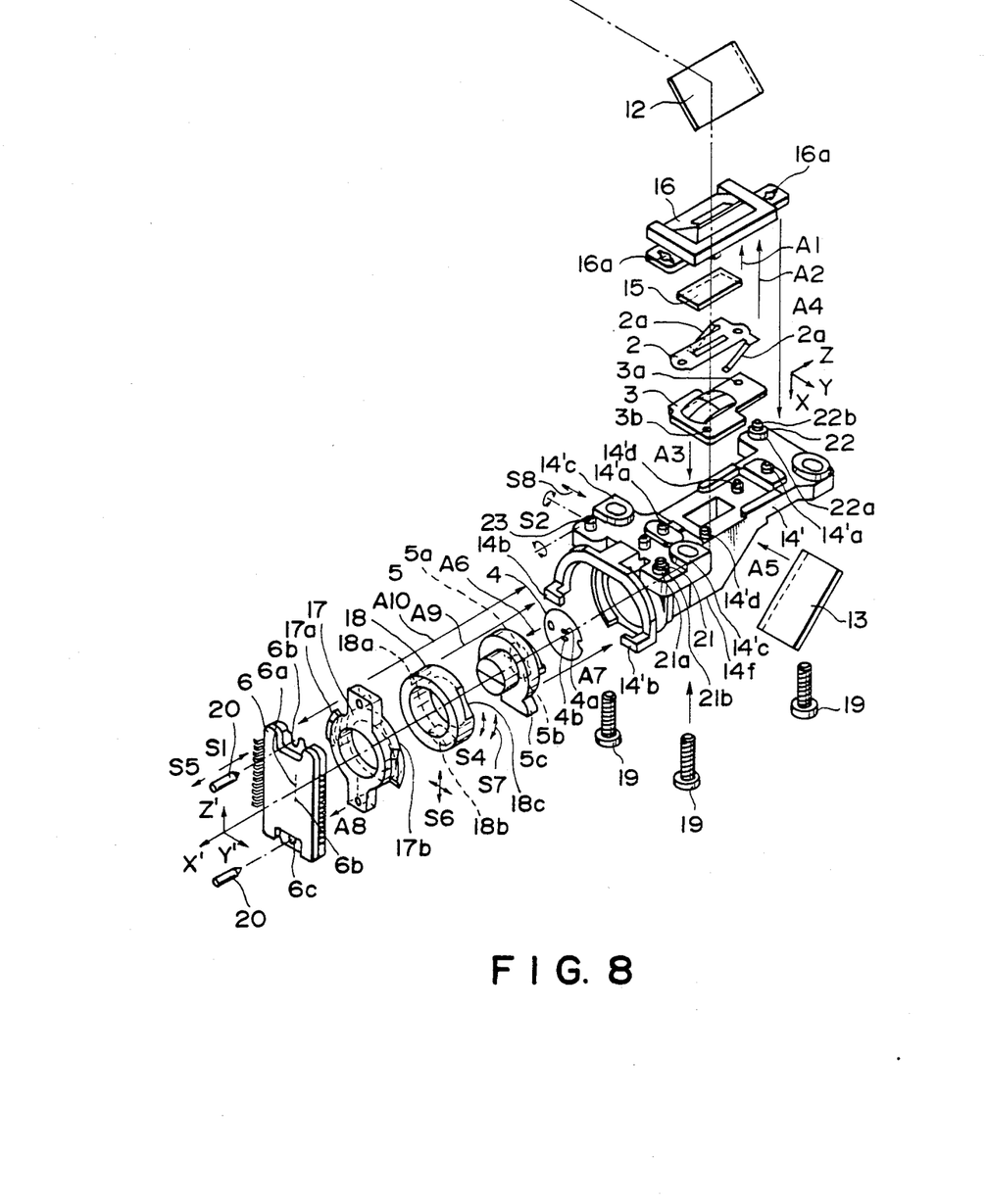
FIG. 8 shows another embodiment of the focusing unit according to the present invention.

An embodiment using a unit body of another construction will now be described. The unit body 14' differs from the unit body 14 of the above-described embodiment in that it is provided with pins 21, 22 and 23 for adjusting the inclination thereof. In the present embodiment, the shape of the field lens also differs a little from that in the previous embodiment.

Assembly and adjustment thereof will now be described with respect only to the differences from the first embodiment.

First, at assembly step S3, the field lens 3 is placed onto the unit body 14' with the protruding members 14'd and 14'b of the unit body 14' fitted in holes 3a and 3b.

Subsequently, at adjustment procedure S2, pupil alignment, i.e., alignment of the focusing unit and the front plate of the camera body with the optic axis, is effected. The adjustment for properly projecting the openings 4a and 4b of the diaphragm 4 into the exit pupil S of the photo-taking lens 1 by the field lens 3 is effected. A line passing through a pupil alignment adjusting screw 21 and a positioning protruded member 23 and a line passing through a pupil alignment adjusting screw 22 and the positioning protruded member 23 are disposed so as to be substantially perpendicular to each other, and when the adjusting screw 21 is turned, the entire focusing unit is slightly rotated about the axis Z with the positioning protruded member 23 as the center. Likewise, when the adjusting screw 22 is turned, the entire focusing unit is slightly rotated about the axis Y, and the rotations in these two directions make the pupil alignment adjustment possible. After the adjustment, the adjusting screws 21 and 22 are adhesively fixed to each other.

Also, when at S8, the focusing unit is to be mounted on the front plate of the camera, the entire focusing unit is moved in the direction of the axis Y to bring the distance measurement center into coincidence with the center of the distance measurement frame in the finder, thereby adjusting the parallax. In this case, guide grooves extending in the direction of the axis Y are formed in the mounting portion of the bottom surface of the front plate of the camera at locations corresponding to the positioning protruded member 23 and adjusting screws 21 and 22 which will later be described, and at the bottom surface of these guide grooves, that is, at the right position of the camera, the ceiling of the grooves is designed to abut against the heads of the adjusting screws 21, 22 and positioning protruded member 23. Accordingly, with the focusing unit being placed on the front plate, the inclination of the focusing unit when pupil alignment was previously effected is re-presented and therefore, pupil alignment need not be again effected, but simply by parallel-moving the focusing unit along the aforementioned guide grooves in the direction of the axis Y, the parallax with respect to the distance measurement frame in the finder can be adjusted.

The parallax in the direction of the axis Z corresponds to the lengthwise direction of the line sensor 6 and therefore does not require so high accuracy as in the direction of the axis Y. Accordingly, here, adjustment of the parallax between the focusing unit and the finder in the direction of the axis Z is not effected. However, adjustment of the parallax in the focusing unit has already been completed by the centering of the line sensor 6 in the plane Y'-Z'.

Figure 9:
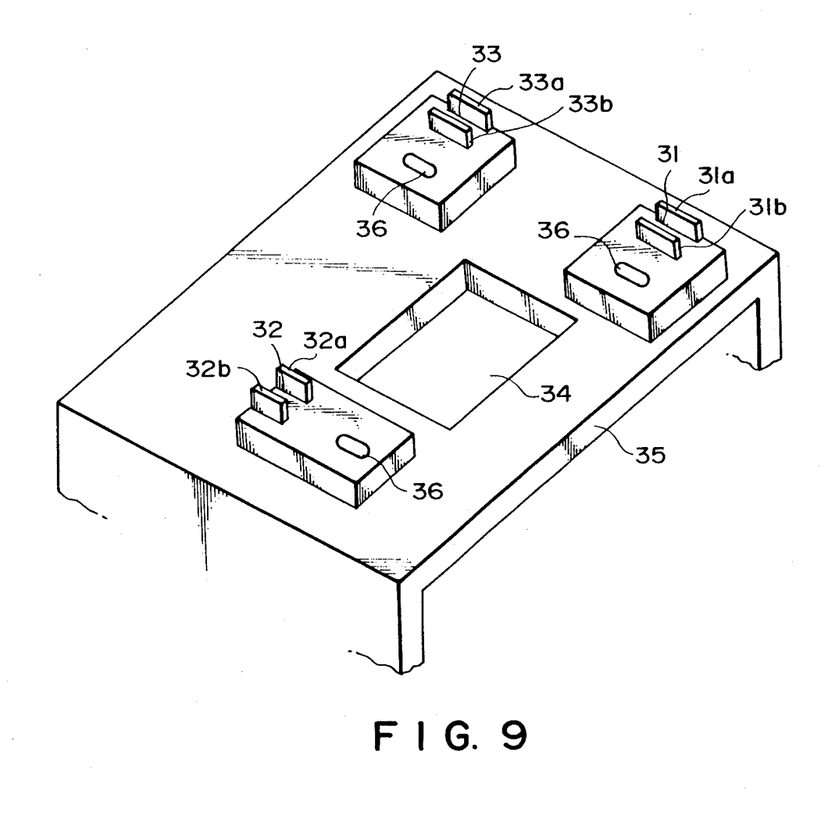
FIG. 9 is a perspective view showing the front plate of a camera.

FIG. 9 is a perspective view of the front plate 35 of the camera as seen from the bottom of the camera. A hole 34 serves to direct the photo-taking light beam to the unit body 14'. The adjusting screws 21, 22 and 23 for position control provided in the unit body 14' shown in FIG. 8 bear against guide grooves 31, 32 and 33, respectively, and the unit body is designed to be moved in the direction of the axis Y.

Reference numeral 36 designates holes for fixing the unit body. These holes 36 receive the mounting screws 19 therein and are elliptical. When the unit body is to be mounted, the tip ends of the adjusting screws 21 and 22 strike against the bottom surface of the groove and the inclination at which the adjusting screws are mounted on an adjusting tool is maintained. Protruding portions 31a, 31b, 32a, 32b, 33a and 33b protruding from the front plate 35 serve as guides for controlling the movement of the unit body in the direction of the axis Y.

As described above, the focusing detecting device according to the present invention can accomplish the pupil alignemnt in the focusing unit and the adjustment of the parallax relative to the finder by the use of a fixed member and two adjusting members, and the working property of assembly and adjusting work is improved, and this is advantageous to automatic assembly and automatic adjustment.

What is claimed is:

1. A device for detecting the focus adjusted state of an objective lens, provided with:
   (a) sensing means for sensing a light beam from said objective lens and producing a signal regarding the focus adjusted state;
   (b) a first member having an inclined surface inclined with respect to the optic axis of said objective lens; and
   (c) a second member having a contact surface which is inclined with respect to the optic axis and which is in surface contact with said first-mentioned surface, and a holding portion for holding said sensing means at a predetermined angle with respect to the optic axis;
   said first and second members being rotated relative to each other with respect to the optic axis, thereby adjusting the inclination of said sensing means, and thereafter said first and second members being fixed.

2. A device according to claim 1, wherein said first member is cylindrical.

3. A device according to claim 1, wherein said second member is cylindrical.

4. A device according to claim 1 or 2, wherein said first and second members are adhesively fixed after the adjustment of the inclination of said sensing means is terminated.

5. A device according to claim 1, wherein said first and second members have an aperture through which the light beam from said objective lens passes.

6. A device for detecting the focus adjusted state of an objective lens, provided with:
   (a) a focus detecting optical system disposed substantially rearwardly of the predetermined imaging plane of said objective lens;
   (b) sensing means for sensing a light beam from said objective lens relayed by said optical system and producing the information about the focus adjusted state;
   (c) unit means constituting said optical system and said sensing means as a unit;
   (d) adjusting means provided in said unit means for adjusting the inclination of said unit means to render the optic axis of said optical system and the optic axis of said objective lens into a predetermined relation;
   (e) a housing in which said unit is mounted; and
   (f) guide means disposed in said housing for guiding said adjusting means in a predetermined direction;
   said unit means being movable along said guide means.

7. A device according to claim 6, wherein said adjusting means is a screw.

* * * * *

UNITED STATES PATENT AND TRADEMARK OFFICE
CERTIFICATE OF CORRECTION

PATENT NO. : 4,728,785

DATED : March 1, 1988

INVENTOR(S) : ICHIRO OHNUKI, ET AL.

It is certified that error appears in the above-identified patent and that said Letters Patent is hereby corrected as shown below:

COLUMN 2

Line 59, "left and b1" should read --left end b1--.

COLUMN 3

Line 16, "arragned" should read --arranged--.

COLUMN 4

Line 30, "whererafter" should read --whereafter--.
Line 44, "lenghwise" should read --lengthwise--.
Line 55, "acis." should read --axis.--.

COLUMN 5

Line 58, "nation" should be deleted.

COLUMN 6

Line 6, "therefore," should read --therefor,--.
Line 17, "stage." should read --stages.--.
Line 27, "angle 0" should read --angle $\theta$--.

UNITED STATES PATENT AND TRADEMARK OFFICE
CERTIFICATE OF CORRECTION

PATENT NO. : 4,728,785

DATED : March 1, 1988

INVENTOR(S) : ICHIRO OHNUKI, ET AL.

It is certified that error appears in the above-identified patent and that said Letters Patent is hereby corrected as shown below:

COLUMN 7

Line 38, "31. 32" should read --31, 32--.
Line 54, "alignemnt" should read --alignment--.

Signed and Sealed this

Twenty-eighth Day of March, 1989

Attest:

DONALD J. QUIGG

Attesting Officer

Commissioner of Patents and Trademarks